Sept. 26, 1961 L. LORENZ ET AL 3,001,608
SOLVENTS FOR THE SEPARATION OF DIOLEFINES
FROM MIXTURES OF HYDROCARBONS
Filed Feb. 24, 1958
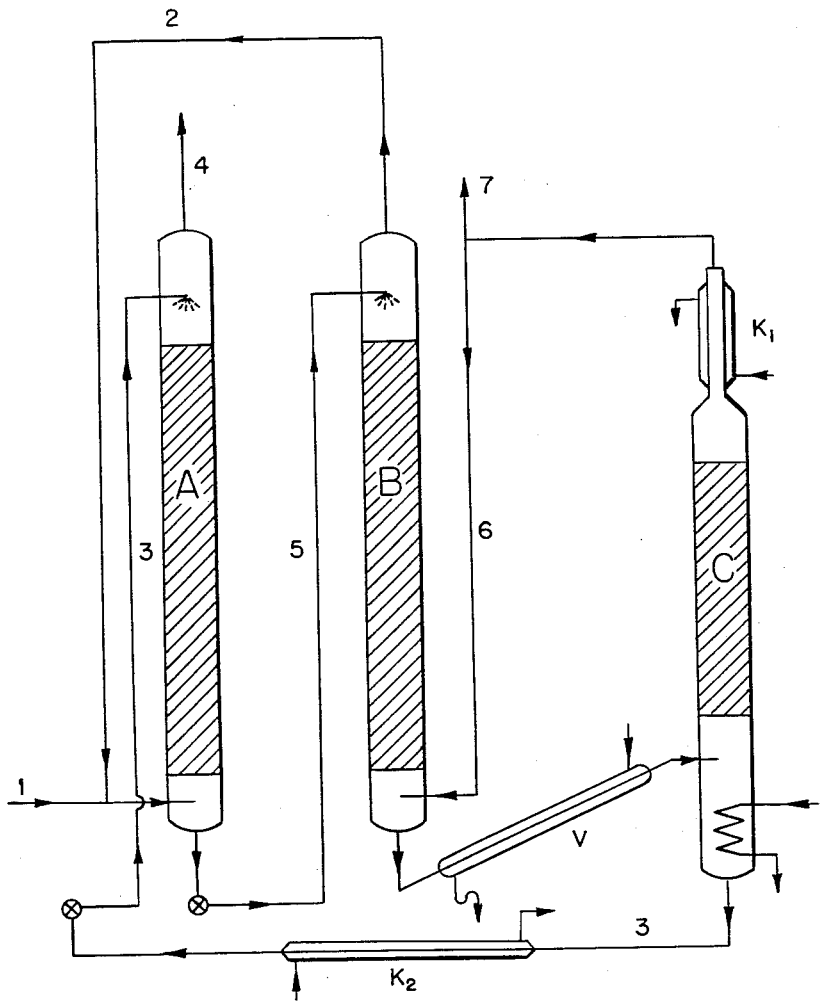
INVENTORS:
LOTHAR LORENZ
HANS-MARTIN WEITZ
BY
ATT'YS

3,001,608
SOLVENTS FOR THE SEPARATION OF DIOLEFINES FROM MIXTURES OF HYDROCARBONS

Lothar Lorenz, Heidelberg, and Hans-Martin Weitz, Ludwigshafen (Rhine), Germany, assignors to Badische Anilin- & Soda-Fabrik Aktiengesellschaft, Ludwigshafen (Rhine), Germany
Filed Feb. 24, 1958, Ser. No. 717,039
Claims priority, application Germany Feb. 23, 1957
9 Claims. (Cl. 183—115)

This invention relates to a solvent for the separation of diolefines from hydrocarbons, especially the separation of diolefines from gaseous hydrocarbon mixtures in which they are contained together with olefines and saturated hydrocarbons.

A special object of the inventon is the separation of olefines and diolefines, especially the separation of butadiene from butenes.

It is known that the separation of olefines and diolefines, for example butylene and butadiene, by fractional distillation is extremely difficult because of the similarity of the boiling points of the materials. For this reason an extractive distillation, for example with furfurol, is often used but this method requires a large number of columns with very many trays and uses up a large amount of steam. Separation by absorption in solutions of copper salts also requires large amounts of steam and chemicals.

It has also been proposed to separate butadiene and butylene by absorption in solvents having selective action followed by fractional desorption.

The object of this invention is to provide a suitable selective solvent for the separation of diolefines from mixtures of hydrocarbons, especially a selective solvent for the separation of olefines and diolefines.

We have now found that the separation of diolefines from hydrocarbon mixtures, especially the separation of olefines and diolefines, can be accomplished with special advantage by using as a solvent having a selective action a saturated heterocyclic compound which contains a carbonyl group. Such solvents include, for example, lactams and lactones which boil above 100° C. Especially useful are lactams with 5 and 6 ring members, for example, pyrrolidone or N-alkylpyrrolidones, of which the alkyl radical has 1 to 8 carbon atoms, piperidone or N-alkylpiperidones, especially those of which the alkyl radical has 1 to 8 carbon atoms, or caprolactam. Suitable lactones with 5 or 6 ring members are, for example, gamma-butyrolactone, delta-valerolactone or derivatives of these substances which have been formed by substitution of hydrogen on a ring carbon atom. Other compounds containing carbonyl groups may however also be used as solvents, for example cycloimines, such as formlypyrrolidine. The said solvents are characterized by a sufficiently great difference in solvent power for the substances to be separated. Moreover, the absolute solubility of the said solvents in respect of diolefines is high. Solvents within the scope of the present invention are compared as regards their selectivity in the following tables with solvents usable for the same purpose of which the individual compounds can be considered as representative of their groups. As a criterion for selectivity we have used the ratio of the Bunsen's solubility coefficients of butadiene to those for butylene at a temperature of 20° C.

$$\text{Selectivity} = \frac{\alpha \text{ butadiene}}{\alpha \text{ butene}}$$

where $\alpha$=the Bunsen's solubility coefficient at 20° C.

The substances selected in Table 1 represent examples of groups of substances from the class of aliphatic, cycloaliphatic and aromatic compounds. The table also contains examples of heterocyclic compounds. Table 2 gives examples of substances within the scope of the present invention.

TABLE 1

| Known solvent: | Selectivity |
|---|---|
| Ligroin (boiling point 100°–150° C.) | 0.7 |
| Trichlorethylene | 0.8 |
| Methanol | 1.5 |
| Isoamyl ether | 0.77 |
| Acetone | 1.48 |
| Acetic acid | 1.2 |
| Ethyl acetate | 1.4 |
| Ethyl oxalate | 1.5 |
| Carbon disulfide | 0.86 |
| Cyclohexane | 0.7 |
| Cyclohexanol | 1.0 |
| Cyclohexanone | 0.75 |
| Ethylbenzene | 0.9 |
| Ortho-chlortoluene | 0.9 |
| Nitrobenzene | 1.35 |
| Anisol | 1.2 |
| Aniline | 1.5 |
| Ethyl benzoate | 1.15 |
| Furfurol | 1.65 |
| Piperidine | 1.68 |

TABLE 2

| | Selectivity |
|---|---|
| N-methylpyrrolidone | 1.95 |
| Butyrolactone | 1.98 |
| Formylpyrrolidine | 2.12 |
| Pyrrolidone | 2.22 |

The selectivity of the solvents can be further increased by addition of water. The amount of water is limited by the decrease in the solubility of the gases with increasing addition of water. It amounts to about 1 to 25% by weight, with reference to the solvent, and advantageously from 3 to 7%.

The following Table 3 shows accurate measurements which illustrate the increase in the selectivity of the solvents used according to this invention brought about by the addition of water.

TABLE 3

| | Percent by weight of water added | $\alpha$ butadiene | $\alpha$ butene-2 | selectivity |
|---|---|---|---|---|
| N-methylpyrrolidone | 0.01 | 83.5 | 42.8 | 1.95 |
| Do | 5.35 | 53.8 | 26.6 | 2.02 |
| Do | 9.76 | 73.7 | 18.5 | 2.04 |
| Butyrolactone | 0.12 | 48.2 | 24.3 | 1.98 |
| Do | 5.20 | 36.3 | 17.4 | 2.09 |
| Do | 10.20 | 27.0 | 12.5 | 2.16 |

In Table 3, $\alpha$ again represents the Bunsen's solubility coefficient, measured at 20° C.

The use of the said solvents has the advantage that by reason of their high solvent power and greater selectivity, smaller apparatus, for example columns, with less extensive separating action can be used. A further advantage of the use of the said solvents lies in the possibility of a complete separation of the diolefines contained in a mixture of gaseous hydrocarbons from the other hydrocarbons. The solvents are suitable, for example, for the separation of olefines with 4 to 6 carbon atoms from diolefines with 4 to 6 carbon atoms, especially for the separation of butadiene from butenes or the separation of isoprene from pentenes. When using the said solvents it is possible to start from gaseous mixtures of olefines and diolefines which have already been purified or from gas mixtures which contain paraffins besides olefines and diolefines. Thus, for example, there is obtained by the dehydrogenation of butane a gas mixture in which are contained, besides the various isomers, butenes and butadiene, varying proportions of non-dehydrated butane and vinylacetylene. The proportion of butane may amount to 70% or more. This is especially the case when a gas mixture is to be separated which has been obtained in a butane dehydrogenation which is preferably operated with only a partial conversion. The solvents are, however, also suitable for the separation of diolefines with 4 to 6 carbon atoms from cracking gases obtained otherwise. In the separation of diolefines from gas mixtures which contain paraffins besides olefines, the olefinic fraction is obtained with the paraffinic hydrocarbons in one friction. A special advantage of the use of these solvents in the separation of diolefines from hydrocarbon mixtures, which contain especially olefines, lies in the fact that the separation is also possible from hydrocarbon mixtures which additionally contain acetylene or acetylene compounds.

In the separation of diolefines and olefines, the gas mixture may be washed with the solvents and the resultant solution freed from the co-dissolved olefine by a gas current which is formed by a part of the separated pure diolefine, and the diolefine separated from the pure solution of diolefine thus obtained by heating and/or treatment with steam.

In carrying out the separation, a gas mixture, such as is obtained by catalytic dehydrogenation of butane, and which contains butadiene, various isomeric butenes, butane, lower-boiling hydrocarbons and vinylacetylene, can be washed in a column with the solvent in countercurrent, the column being provided with suitable exchange devices. In this way practically the whole of the butadiene, part of the butenes, small amounts of butane as well as the whole of the vinylacetylene are taken up by the solvent. The hydrocarbons with small solubility are expelled from the resultant solution by a partial stream of the pure butadiene obtained by the process, by leading the solution in a second column in countercurrent to the pure gaseous butadiene. The procedure, for example, can consist of passing pure gaseous butadiene into the bottom of a filler body column and trickling the solution which is introduced at the top down through the column. At the bottom of this column there is obtained a pure solution of butadiene and vinylacetylene the solubility of which exceeds the solubility of butadiene. The butadiene can be gassed out from this solution by heating and/or treatment with steam. In many cases it is not necessary to remove separately any vinyl acetylene contained therein. If it is desired to obtain a pure butadiene however, the expelled mixture of butadiene and vinylacetylene is washed with the solution to be gassed out, whereby the vinyl acetylene becomes enriched at the bottom of the column whence it is removed together with a small amount of butadiene. The pure butadiene is taken off at the top of the column.

Another method of carrying out the separation consists of leading a gas mixture to be separated into the middle of a column which is trickled from the top with solvent. In the lower part of the column, the downwardly flowing solution is heated to such an extent that the saturated hydrocarbons, olefines and a small part of the diolefines set free by the partial degasification ascend in the column and intensify the separating action. The solvent can then be degassed in a separate stripping column by heating and/or treatment with steam. The solvent freed from diolefines, for example butadiene, can be used again, i.e. in carrying out the process continuously the degassed solvent is returned to the first column.

The separation is in general carried out at temperatures above the boiling point of the hydrocarbons to be separated up to 200° C., advantageously at a temperature slightly above the boiling point of the hydrocarbons at normal or slightly increased pressure, for example at 1 to 10 atmospheres, and advantageously at 1 to 3 atmospheres. In the separation of butadiene from gas mixtures containing butene, the operation can be carried out at 0° to 50° C., especially at 20° to 40° C. and advantageously at normal pressure.

The following examples will further illustrate this invention but the invention is not restricted to these examples. The examples are given with reference to the accompanying drawing which shows diagrammatically an apparatus suitable for use according to this invention.

*Example 1*

Into the bottom of a tower A of 20 mm. diameter and 1800 mm. length which is filled with rings made of $V_2A$ steel wire netting, there are introduced per hour through a pipe 1 80 litres of a gas mixture which contains 49% of butadiene, 20% of butene-1, 11% of cis-butene-2, 19% of trans-butene-2 and traces of isobutene, ethylene and propane, together with 90 litres per hour of return gas through a pipe 2.

This gas mixture is washed in countercurrent at a temperature of 23° C. in the tower A with 4.2 litres per hour of N-methylpyrrolidone containing about 5% by weight of water which is sprayed into the top of the tower through a pipe 3, the washing effect being so extensive that the gas leaving through a pipe 4 (42 litres per hour) only contains 3 to 4% of butadiene. The N-methylpyrrolidone containing butadiene which flows away at the bottom of the tower A is led through a pipe 5 to the top of a tower B. In tower B, which has the same dimensions as tower A and also is filled with rings of wire netting of $V_2A$ steel, the N-methylpyrrolidone comes into contact with the part of the butadiene returned through a pipe 6 from a tower C. The N-methylpyrrolidone which is now saturated with butadiene is led from the bottom of the tower B through a preheater V heated with steam into the tower C and is degassed therein with steam. The temperature in the degassing column is regulated so that the water content of the N-methylpyrrolidone amounts to 5%; in this case this is 150° C. The gas set free, after condensation of entrained steam in a condenser $K_1$, is withdrawn through a pipe 6 and, after 38 litres per hour have been withdrawn through a pipe 7 as pure butadiene, returned to the tower B. The branched-off pure butadiene contains only 1 to 2% of extraneous gas. The degassed N-methylpyrrolidone is returned to the top of the tower A through the pipe 3 after cooling to 23° C. by an interposed water cooler $K_2$.

*Example 2*

In a tower A of 6 metres height and 50 mm. diameter, which is filled with rings made of glass, 200 litres per hour of a $C_4$-cracking gas fraction which according to infra-red analysis consists of 9% of butene-1, 5% of cis- and 11% of trans-butene-2, 32% of isobutene, 9% of normal-butane, 3% of isobutane and 25% of butadiene and $C_3$-hydrocarbons are washed with 9.5 litres per hour of N-methylpyrrolidone which contains 7% of water. At the top of the tower there is withdrawn 148 litres per hour of a gas which contains less than 1.5% of butadiene.

In tower B, also 6 metres in height and 50 mm. wide and filled with Raschig rings, the solution is treated with such an amount of the butadiene gassed out in tower C that the butadiene withdrawn from the pipe 7 (46 litres per hour) is practically pure. Its melting point lies at −109.1° C. (+0.003°) which corresponds to 99.4±0.1 mol) of butadiene.

We claim:

1. In a method for the separation of butadiene from a cracking gas mixture which consists essentially of butene isomers, butane isomers and $C_3$-hydrocarbons as well as butadiene, the improvement which comprises using N-methylpyrrolidone as a selective solvent for said butadiene.

2. In a method for the separation of butadiene from a cracking gas mixture which consists essentially of butene isomers, butane isomers and $C_3$-hydrocarbons as well as butadiene, the improvement which comprises using N-methylpyrrolidone containing 1 to 15% by weight of water as a selective solvent for said butadiene.

3. In a method for the separation of diolefines having from 4–6 carbon atoms from gaseous hydrocarbon mixtures which mixtures contain olefines in addition to said diolefines the improvement which comprises using as a solvent for said diolefines a material selected from the group consisting of lactams having a boiling point above 100° C., lactones having a boiling point above 100° C., and formylpyrrolidine.

4. In a method for the separation of diolefines having from 4–6 carbon atoms from gaseous hydrocarbon mixtures which mixtures contain olefines in addition to said diolefines the improvement which comprises using as a solvent for said diolefines a material selected from the group consisting of lactams having a boiling point above 100° C., lactones having a boiling point above 100° C., and formylpyrrolidine to which material 1–15% by weight of water has been added.

5. In a method for the separation of diolefines having from 4–6 carbon atoms from gaseous hydrocarbon mixtures which mixtures contain olefines in addition to said diolefines the improvement which comprises using N-methylpyrrolidone as a selective solvent for said diolefines.

6. In a method for the separation of diolefines having from 4–6 carbon atoms from hydrocarbon mixtures which mixtures contain olefines in addition to said diolefines the improvement which comprises using butyrolactone as a selective solvent for said diolefines.

7. In a method for the separation of diolefines having from 4–6 carbon atoms from hydrocarbon mixtures which mixtures contain olefines in addition to said diolefines the improvement which comprises using formylpyrrolidine as a selective solvent for said diolefines.

8. In a method for the separation of diolefines having from 4–6 carbon atoms from hydrocarbon mixtures obtained by dehydrogenating butane the improvement which comprises using as a solvent for said diolefines a material selected from the group consisting of lactams having a boiling point above 100° C., lactones having a boiling point above 100° C., and formylpyrrolidine.

9. In a method for the separation of butadiene from hydrocarbon mixtures obtained by dehydrogenating butane the improvement which comprises using as a solvent for said diolefines a material selected from the group consisting of lactams having a boiling point above 100° C., lactones having a boiling point above 100° C., and formylpyrrolidine.

References Cited in the file of this patent

UNITED STATES PATENTS 2,664,997     Eck _____ Jan. 5, 1954